United States Patent
Estrada

(10) Patent No.: US 11,818,086 B1
(45) Date of Patent: Nov. 14, 2023

(54) GROUP VOICE CHAT USING A BLUETOOTH BROADCAST

(71) Applicant: Sony Group Corporation, Tokyo (JP)

(72) Inventor: Andrew Estrada, Escondido, CA (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/877,281

(22) Filed: Jul. 29, 2022

(51) Int. Cl.
G06F 15/173 (2006.01)
H04L 51/10 (2022.01)
H04L 51/48 (2022.01)

(52) U.S. Cl.
CPC .............. *H04L 51/10* (2013.01); *H04L 51/48* (2022.05)

(58) Field of Classification Search
None
See application file for complete search history.

(56) References Cited

U.S. PATENT DOCUMENTS

| | | | | |
|---|---|---|---|---|
| 7,486,932 B2 * | 2/2009 | Palin | ..................... | H04W 16/14 370/444 |
| 8,180,363 B2 * | 5/2012 | Maekawa | ................ | A63F 13/31 455/448 |
| 9,712,662 B2 | 7/2017 | Glezerman | | |
| 2018/0039836 A1 * | 2/2018 | Song | ....................... | H04N 7/142 |
| 2020/0075000 A1 * | 3/2020 | Merhej | ................. | H04L 51/214 |

FOREIGN PATENT DOCUMENTS

| | | | | |
|---|---|---|---|---|
| CN | 108156231 B | 11/2020 | | |
| CN | 112040459 A | 8/2021 | | |
| CN | 108492546 B | 12/2021 | | |
| CN | 115294987 A | * 3/2022 | | |
| KR | 2002032799 A | * 5/2002 | ........... | H04L 65/403 |
| WO | WO-2016027561 A1 | * 2/2016 | ............. | G06F 13/00 |

OTHER PUBLICATIONS

Wireless Audio Communication Network for In-VehicleAccess of Infotainment Services in Motorcycles https://ieeexplore.ieee.org/abstract/document/4022261 2006 IEEE 17th International Symposium on Personal, Indoor and Mobile Radio Communications.

* cited by examiner

*Primary Examiner* — Yves Dalencourt
(74) *Attorney, Agent, or Firm* — Trellis IP Law Group, PC

(57) ABSTRACT

In some implementations, a method includes initiating, at a first device of a group of devices, a group voice chat between the first device and one or more other devices of the group of devices in a Bluetooth broadcast, where audio transmissions of the group voice chat are transmitted in a sequence of time intervals, and where the time intervals include subintervals. The method further includes allocating a first subinterval of the subintervals to the first device, the first device transmits a first audio message during the first subinterval, and where the first audio message is broadcast to the group of devices. The method further includes allocating a second subinterval of the subintervals to a second device of the group of devices, where the second device transmits a second audio message during the second subinterval, and where the second audio message is broadcast to the group of devices.

20 Claims, 9 Drawing Sheets

Transmission Schedule

| SI-1 | SI-2 | SI-3 | SI-4 | SI-5 | SI-6 | SI-7 | SI-8 |
|---|---|---|---|---|---|---|---|
| 810 | 820 | 830 | 840 | 850 | 860 | 870 | 880 |
| (N-1)(L-1) | (N-1)(R-1) | (N-2)(L-2) | (N-2)(R-2) | (N-3)(L-3) | (N-3)(R-3) | (N-4)(L-4) | (N-4)(R-4) |

GROUP VOICE CHAT USING A BLUETOOTH BROADCAST

CROSS REFERENCE TO RELATED APPLICATIONS

This application is related to U.S. patent application Ser. No. 17/877,284, entitled "PEER-TO-PEER BLUETOOTH VOICE CHAT," filed Jul. 29, 2022, which is hereby incorporated by reference as if set forth in full in this application for all purposes.

BACKGROUND

Technologies exist for enabling people to talk to each other in a group. Some technologies use either a push-to-talk or voice detect approach, because only one person can talk at a time. This approach does not allow for a normal conversation, where speakers sometimes overlap with each other. Ambient noise may also cause false triggers of the voice detect mechanism. Some solutions use a daisy chain approach, where the audio carrying radio signal is received and forwarded from one device to the next. This approach can fail if any single device moves out of range or stops working.

SUMMARY

Implementations generally relate to a group voice chat using a Bluetooth broadcast. In some implementations, a system includes one or more processors, and includes logic encoded in one or more non-transitory computer-readable storage media for execution by the one or more processors. When executed, the logic is operable to cause the one or more processors to perform operations including: initiating, at a first device of a group of devices, a group voice chat between the first device and one or more other devices of the group of devices in a Bluetooth broadcast, where audio transmissions of the group voice chat are transmitted in a sequence of time intervals, and where the time intervals include subintervals; allocating a first subinterval of the subintervals to the first device, where the first device transmits a first audio message during the first subinterval, and where the first audio message is broadcast to the group of devices; and allocating a second subinterval of the subintervals to a second device of the group of devices, where the second device transmits a second audio message during the second subinterval, and where the second audio message is broadcast to the group of devices.

With further regard to the system, in some implementations, one or more devices of the group of devices are wearable devices. In some implementations, a transmission schedule indicates an allocation of subintervals to devices of the group of devices. In some implementations, a transmission schedule indicates subintervals for transmission of audio messages and subintervals for transmission of control data. In some implementations, the first device manages a transmission schedule, and where the first device broadcasts the transmission schedule to the group of devices. In some implementations, the logic when executed is further operable to cause the one or more processors to perform operations including maintaining a predetermined number of available subintervals based on a number of devices in the group of devices. In some implementations, the logic when executed is further operable to cause the one or more processors to perform operations including enabling at least one remote device to join the group of devices via at least one existing device of the group of devices.

In some implementations, a non-transitory computer-readable storage medium with program instructions thereon is provided. When executed by one or more processors, the instructions are operable to cause the one or more processors to perform operations including: initiating, at a first device of a group of devices, a group voice chat between the first device and one or more other devices of the group of devices in a Bluetooth broadcast, where audio transmissions of the group voice chat are transmitted in a sequence of time intervals, and where the time intervals include subintervals; allocating a first subinterval of the subintervals to the first device, where the first device transmits a first audio message during the first subinterval, and where the first audio message is broadcast to the group of devices; and allocating a second subinterval of the subintervals to a second device of the group of devices, where the second device transmits a second audio message during the second subinterval, and where the second audio message is broadcast to the group of devices.

With further regard to the computer-readable storage medium, in some implementations, one or more devices of the group of devices are wearable devices. In some implementations, a transmission schedule indicates an allocation of subintervals to devices of the group of devices. In some implementations, a transmission schedule indicates subintervals for transmission of audio messages and subintervals for transmission of control data. In some implementations, the first device manages a transmission schedule, and where the first device broadcasts the transmission schedule to the group of devices. In some implementations, the instructions when executed are further operable to cause the one or more processors to perform operations including maintaining a predetermined number of available subintervals based on a number of devices in the group of devices. In some implementations, the instructions when executed are further operable to cause the one or more processors to perform operations including enabling at least one remote device to join the group of devices via at least one existing device of the group of devices.

In some implementations, a method includes: initiating, at a first device of a group of devices, a group voice chat between the first device and one or more other devices of the group of devices in a Bluetooth broadcast, where audio transmissions of the group voice chat are transmitted in a sequence of time intervals, and where the time intervals include subintervals; allocating a first subinterval of the subintervals to the first device, where the first device transmits a first audio message during the first subinterval, and where the first audio message is broadcast to the group of devices; and allocating a second subinterval of the subintervals to a second device of the group of devices, where the second device transmits a second audio message during the second subinterval, and where the second audio message is broadcast to the group of devices.

With further regard to the method, in some implementations, one or more devices of the group of devices are wearable devices. In some implementations, a transmission schedule indicates an allocation of subintervals to devices of the group of devices. In some implementations, a transmission schedule indicates subintervals for transmission of audio messages and subintervals for transmission of control data. In some implementations, the first device manages a transmission schedule, and where the first device broadcasts the transmission schedule to the group of devices. In some implementations, the logic when executed is further operable to cause the one or more processors to perform operations including maintaining a predetermined number of available subintervals based on a number of devices in the group of devices. In some implementations, the method further includes enabling at least one remote device to join the group of devices via at least one existing device of the group of devices.

A further understanding of the nature and the advantages of particular implementations disclosed herein may be realized by reference of the remaining portions of the specification and the attached drawings.

BRIEF DESCRIPTION OF THE DRAWINGS

FIG. 8 is an example diagram of a transmission schedule, according to some implementations.

DETAILED DESCRIPTION

Implementations described herein provide group voice chats and peer-to-peer voice chats using Bluetooth broadcasting. As described in more detail herein, implementations transform a broadcast or one-to-many topology into a many-to-many topology for members or nodes within the network. In addition, implementations allow all nodes in the network to distribute data with very low latency with all other nodes in the network.

As described in more detail herein, in various implementations, a system initiates, at a first node, a group voice chat between the first node and one or more other nodes in a Bluetooth broadcast. Audio transmissions of the group voice chat are transmitted in a sequence of time intervals, where the time intervals include subintervals. The system further allocates a first subinterval to the first device, where the device broadcasts an audio message during the first subinterval to other nodes in the chat. The system further allocates a subinterval to one or more other nodes in the chats. These other nodes may broadcast audio messages to the nodes of the group during their respective subintervals.

In various implementations, a system transmits, from a first terminal node, a first audio message to a second terminal node, where the first terminal node includes a first left ear device and a first right ear device. The second terminal node also includes a second left ear device and a second right ear device. The system further transmits, from the second terminal node, an audio message to the first terminal node. In various implementations described herein, audio transmissions of a voice chat are transmitted directly between the first terminal node and the second terminal node without the need for a centralized device.

Figure 1:
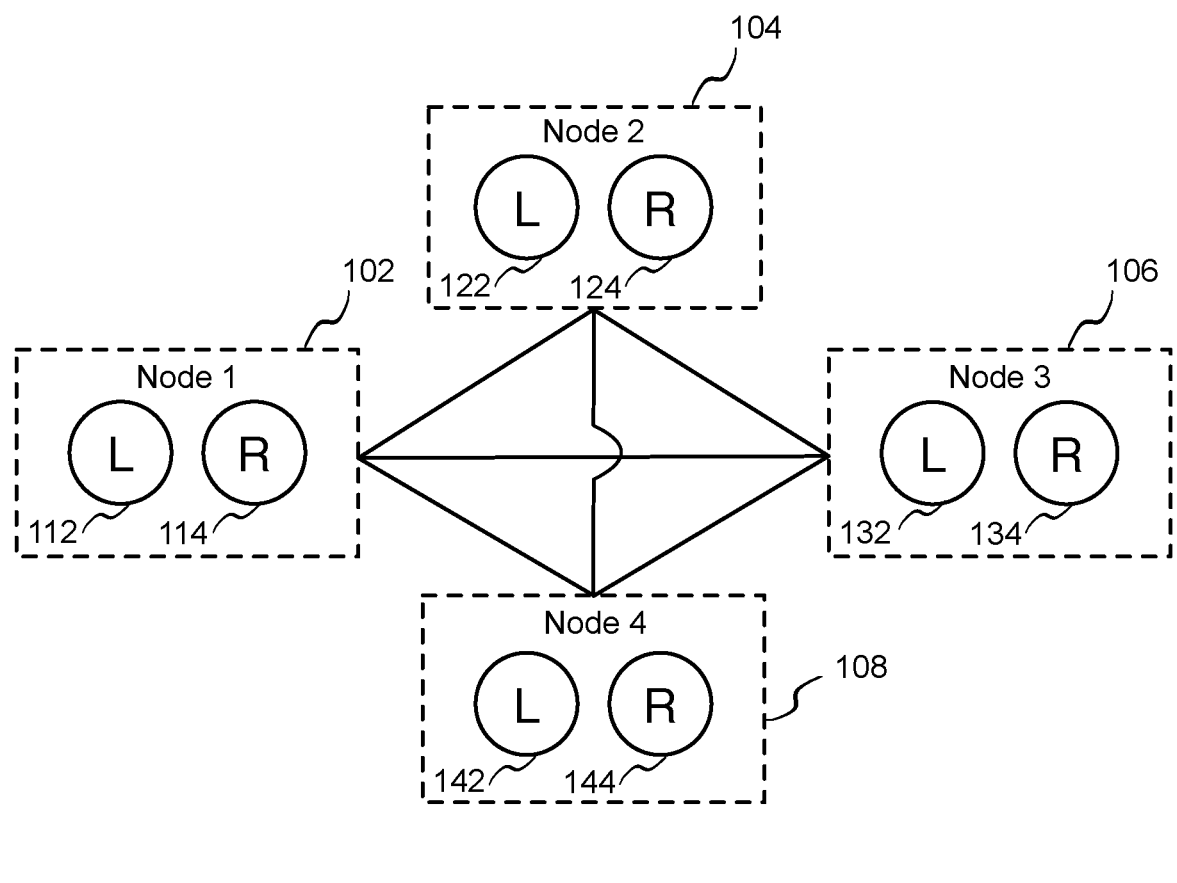
FIG. 1 is a block diagram of an example network environment for providing voice chats in a Bluetooth broadcast, which may be used for implementations described herein.

FIG. 1 is a block diagram of an example network environment 100 for providing voice chats in a Bluetooth broadcast, which may be used for implementations described herein. In various implementations, network environment 100 includes a system 102 or node 102 (also labeled Node 1). Also shown are systems or nodes 104, 106, and 108 (also labeled Node 2, Node 3, and Node 4).

In various example scenarios described herein, node 102 may initiate a chat with another node in a peer-to-peer chat (e.g., a chat with node 104) or may initiate a group voice chat with multiple nodes (e.g., a group voice chat with node 104, 106, and 108, etc.). The connecting lines shown indicate direct communication paths between a given node and other nodes in the group voice chat. In various implementations, chats described herein involve Bluetooth broadcasting, where audio messages are broadcast to the nodes participating in a given chat.

For ease of illustration, example scenarios described herein involve node 102 initiating chats and node 102 sending audio messages to one or more other nodes in a broadcast, where other nodes subsequently respond with their audio messages in broadcasts. In various implementations, any other node may also initiate chats. In other words, the system of node 102 used to initiate chats may be similar in function as the systems of other nodes. As such, implementations described herein may apply to any one of nodes 102, 104, 106, and 108.

Also, node 102-108 may be referred to as call terminals or terminal nodes. Implementations described herein enable these terminal nodes to communicate directly with each other in chats without the need for a network gateway or call gateway (e.g., a smartphone). The terms system, node, terminal node, terminal node device, node, and device may be used interchangeably, depending on the context being described.

Note that while the term group voice chat may refer to a chat typically involving three, four, or more nodes (e.g., nodes 102, 104, 106, and 108, etc.), the term group voice chat may also involve just two nodes (e.g., nodes 102 and 104). A two-node group voice chat may be a case where a group voice chat starts with two nodes, and other nodes subsequently join (e.g., after a time period). This may also be a case where a group voice chat starts with two nodes and no other node joins for the duration of the chat (e.g., no other node joins at all, no other node is invited or allowed to join a chat, etc.). This may also be the cases where the chat started with more members and only 2 remain.

In various implementations, each node 102, 104, 106, and 108 includes a left ear device and a right ear device (labeled L and R). For example, node 102 includes left ear device 112 and 114, node 104 includes left ear device 122 and 124, node 106 includes left ear device 132 and 134, and node 108 includes left ear device 142 and 144. The term node may be used to refer to a pair of left and right ear devices. There may be some scenarios where a given node is itself a device, with left ear and right ear device components. In various implementations, each of the left and right ear devices has a microphone for receiving voice messages from users. There may be other scenarios where a given node refers to a single device such as single mono speaker. A microphone may be separate from or integrated with a given speaker of a node.

In various implementations, left and right ear devices may be wearable devices such as separate earbuds, components of a headset, etc. Alternatively, the various implementations described herein also apply to non-wearable devices, which have integrated or stand-alone left and right speakers. Implementations may also apply to non-wearable devices integrated into a vehicle (e.g., motorcycle, car, truck, bus, airplane, etc.) or hand-held devices such smartphones. The terms left ear device and left device may be used interchangeably, depending on the context. Also, the terms right ear device and right device may be used interchangeably, depending on the context. Implementations may involve wired earphones that connect to a non-wearable device such as smartphone. There may be some scenarios where a given node device has a single speaker, where the given node outputs audio messages from the single speaker (i.e., instead of two earbuds).

In various implementations, environment 100 may involve, for example, a group of motorcyclists riding in a group, where the motorcyclists desire to talk to each other while riding in a group. Group voice chats using Bluetooth broadcasting allows the members of the group to talk to each other while riding independently. Implementations may also apply to a group of people who want to talk but who may be distant from each or may be in a noisy environment such as bar, sporting event, etc. Environment 100 may represent various environments, and will depend on the particular implementation.

For ease of illustration, FIG. 1 shows four blocks for nodes 102, 104, 106, and 108. There may be any number of nodes. In other implementations, environment 100 may not have all of the components shown and/or may have other elements including other types of elements instead of, or in addition to, those shown herein.

While system or node 102 performs implementations described herein, in other implementations, any suitable component or combination of components associated with node 102 or any suitable processor or processors associated with node 102 may facilitate performing the implementations described herein.

Figure 2:
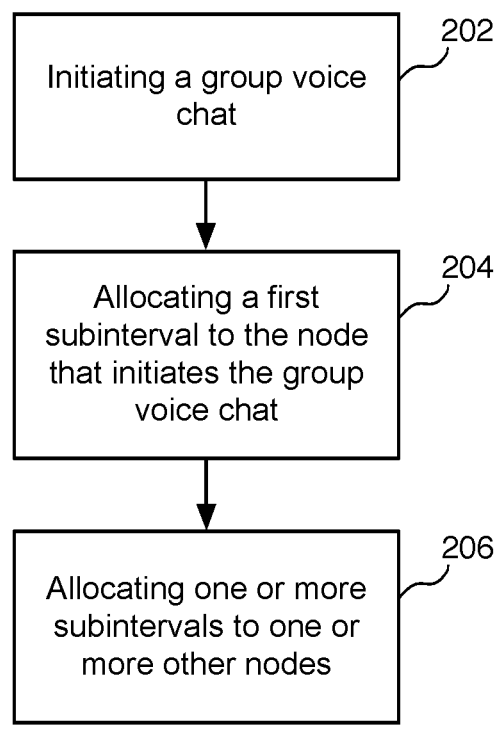
FIG. 2 is an example flow diagram for enabling a group voice chat, according to some implementations.

FIG. 2 is an example flow diagram for enabling a group voice chat, according to some implementations. Referring to both FIGS. 1 and 2, a method is initiated at block 202, where a system such as node 102 initiates a group voice chat between node 102 and one or more other nodes of the group such as of nodes in a Bluetooth broadcast. As indicated herein, a given node may represent a single device (e.g., a single earbud) or may represent a set of devices (e.g., a pair of devices).

In various implementations, one or more devices of a node may be wearable devices. As indicated herein, in various implementations, the wearable devices may be earbud devices, as well as types of devices attached to users participating in the group voice chat. The group of devices may also include non-wearable devices. For example, the group of devices may include Bluetooth devices attached to or integrated with a vehicle (e.g., car, motorcycle, car, truck, bus, airplane, etc.).

Figure 3:
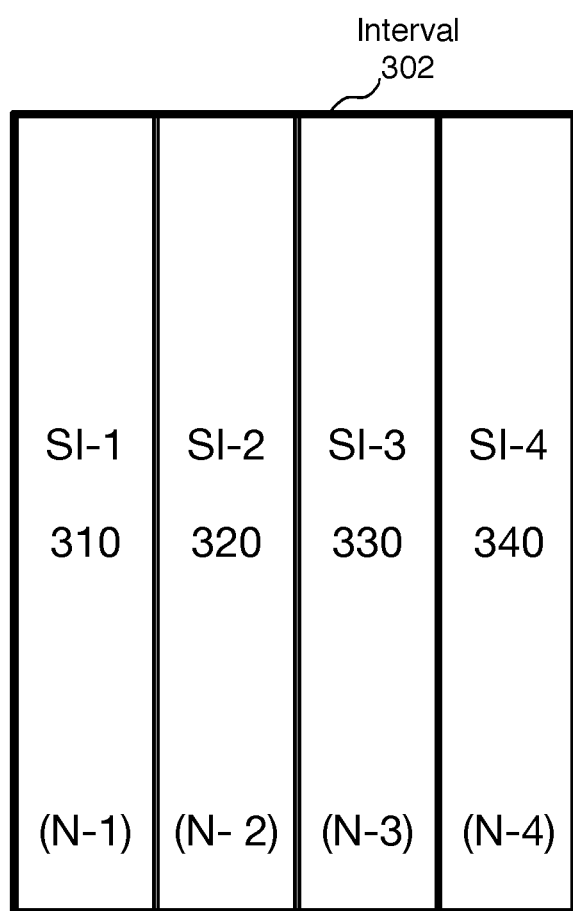
FIG. 3 is an example diagram of a transmission schedule, according to some implementations.

FIG. 3 is an example diagram of a transmission schedule 300, according to some implementations. Shown are is a time interval 302, within which audio messages are broadcast. In various implementations, audio transmissions of a group voice chat are transmitted in a sequence of time intervals. As shown, each time interval includes subintervals. For example, interval 302 includes subintervals 310, 320, 330, and 340 (also labeled SI-1, SI-2, SI-3, and SI-4). In various implementations, a time interval is a time slot that is dedicated to a given node for transmitting audio messages and associated control data. Audio messages are chat messages broadcast to devices of participants in the group voice chat. Control data may include control information for volume, for example. Control data associated with a given audio message may be transmitted in the same subinterval or in a different subinterval, depending on the particular implementation. In various implementations, a given transmission schedule may include additional subintervals (not shown) that may be composed of duplicates of audio messages for redundancy, in case any messages get dropped due to interference or other technical issues. The transmission schedule described herein enables recipient nodes to determine how many transmissions are potentially coming, when they are coming, and the nature of each transmission.

At block 204, the system allocates a first subinterval of the subintervals to a node that initiates a chat such as node 102 of FIG. 1. As shown in FIG. 3, subinterval 310 may be allocated or assigned to node 102 (also labeled N-1 in FIG. 3). In various implementations, as indicated above, the node transmits an initial audio message during its designated subinterval, where the audio message is broadcast to the other nodes in the chat.

At block 206, the system allocates one or more subintervals to one or more other nodes in the chat, such as nodes 104, 106, and 108 of FIG. 1. As shown in FIG. 3, subintervals 320, 330, and 340 may be allocated or assigned to respective nodes 104, 106, and 108 (also labeled N-2, N-3, and N-4, respectively).

In various implementations, transmission schedule 300 indicates the allocation of subintervals to devices of the group of devices. This enables each node to determine from transmission schedule 300 when a particular node might broadcast an audio message to be received. Transmission schedule 300 also indicates to a given node when that node is permitted to broadcast an audio message. A given interval is relatively short in duration (e.g., 10 milliseconds, 100 milliseconds, etc.), and the duration may vary depending on the particular implementation. As described in more detail herein, the size of the intervals and their corresponding subintervals, and the number of subintervals in an interval may be adjusted dynamically, depending on the nature of the nodes joining a group voice chat.

In various implementations, the devices of other nodes in the chat (e.g., nodes 104-108 etc.) transmit subsequent audio messages during their respectively assigned subintervals, where their audio messages are broadcast to the group of nodes in the group voice chat.

As indicated above, a given transmission schedule indicates subintervals for transmission of audio messages and subintervals for transmission of control data. In various implementations, the node (e.g., node 102) that initiates the chat generates, stores, and manages the transmission schedule. Various implementations directed toward changes to the transmission schedule are described in more detail herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In various implementations, the node that initiates a given chat manages transmission schedule 300. For example, node 102 distributes or broadcasts copies of transmission schedule 300 to the group of other nodes 104, 106, and 108 in the chat. Node 102 also modifies the transmission schedule based on various predetermined rules or policies.

Because the other nodes in the group receive the transmission schedule, the other nodes can determine from the transmission schedule when to expect a transmission from any other device. Each node also determines from the transmission schedule when it can transmit an audio message to the group.

In indicated above, the size and number of subintervals in the transmission schedule 300 may vary, depending on predetermined rules or policies. For example, in various implementations, the system accommodates new nodes added to the group of nodes in the chat. In various implementations, the system maintains a predetermined number of available subintervals based on a number of nodes in the group. For example, the system may preserve a predetermined number of available subintervals (e.g., one subinterval, two subintervals, three subintervals, etc.) to be allocated to any new nodes that join the group.

In some implementations where the predetermined number of available subintervals is one subinterval, and if that subinterval is subsequently allocated to a new joining node, the system generates a new available subinterval. This has the benefit of keeping the size of the transmission schedule small, and to a minimal size. Alternatively, for a minimum size, the system may generate a new subinterval for each new node that joins when that node joins. This results in a minimal transmission table size, which decreases latency in transmissions.

In some implementations, where the predetermined number of available subintervals is two or more subintervals, and if at least one of the available subintervals is subsequently allocated, the system generates one or more new available subintervals. This also has the benefit of keeping the size of the transmission schedule small, and to a relatively minimal size.

As such, the system dynamically adjusts the number of available subintervals based on changes to a number of nodes currently in the group. In some implementations, the system may change the number of available subintervals based on the total number of nodes currently in the group. For example, a bigger group (e.g., ten devices, twenty devices, etc.) may indicate a potential for an influx of new nodes. As such, the system may increase the number of available subintervals if the number of nodes in the group increases above a predetermined threshold. The system may reduce the number of available subintervals if the number of nodes in the group decreases below a predetermined threshold.

In some implementations, the system may change the number of available subintervals based on the frequency that the total number of nodes change in the group change. For example, a higher frequency of devices of nodes requesting to join the group may indicate a potential for an influx of new nodes. As such, the system may increase the number of available subintervals if the frequency of devices in the nodes increases above a predetermined threshold. The system may reduce the number of available subintervals if the frequency of devices in the node decreases below a predetermined threshold.

The particular number of available subintervals for newly joining nodes may vary, depending on the implementation. While a larger transmission schedule with more available subintervals may contain results in a larger payload when stored and broadcast, a larger transmission table may enable the system to more rapidly assign more subintervals to new nodes added to the group. This may be more beneficial as the frequency of newly added devices increases.

In various implementations, as nodes leave the group, the system may subsequently disassociate the leaving nodes from its respective subinterval. This frees up the subinterval for other new nodes that join the group. In some implementations, the system may reduce the number of available unassigned subintervals if the number increases above a predetermined threshold (e.g., above one, two, three, four subintervals, etc.).

In some scenarios, if the node that initiates a chat such as node 102 leaves the chat before the chat ends, the system or another node takes over as the manager of the transmission schedule. The system may recognize a given node as leaving the chat when the node disconnects from the group. For example, node 102 may lose connection due to losing power to its associated device(s) or may lose connection due to going out of range.

The system may reassign management of the transmission schedule to another node in the group voice chat based on one or more predetermined rules or policies. For example, in various implementations, the system may reassign management of the transmission schedule to the second node to join the chat. A protocol or instructions for handing off management to another node may be contained in the transmission schedule or sent with the transmission schedule. As such, other nodes are on standby for taking over management if the circumstance arises.

In some implementations, if subsequent managing nodes leave the group voice chat, the system may continue to the next oldest node to join the group voice chat. In some implementations, if a given node such a node 102 rejoins the group, that node goes to the end of the queue for assuming the function of manager of the transmission schedule. In various implementations, each managing node periodically broadcasts updates to the transmission schedule.

Figure 4:
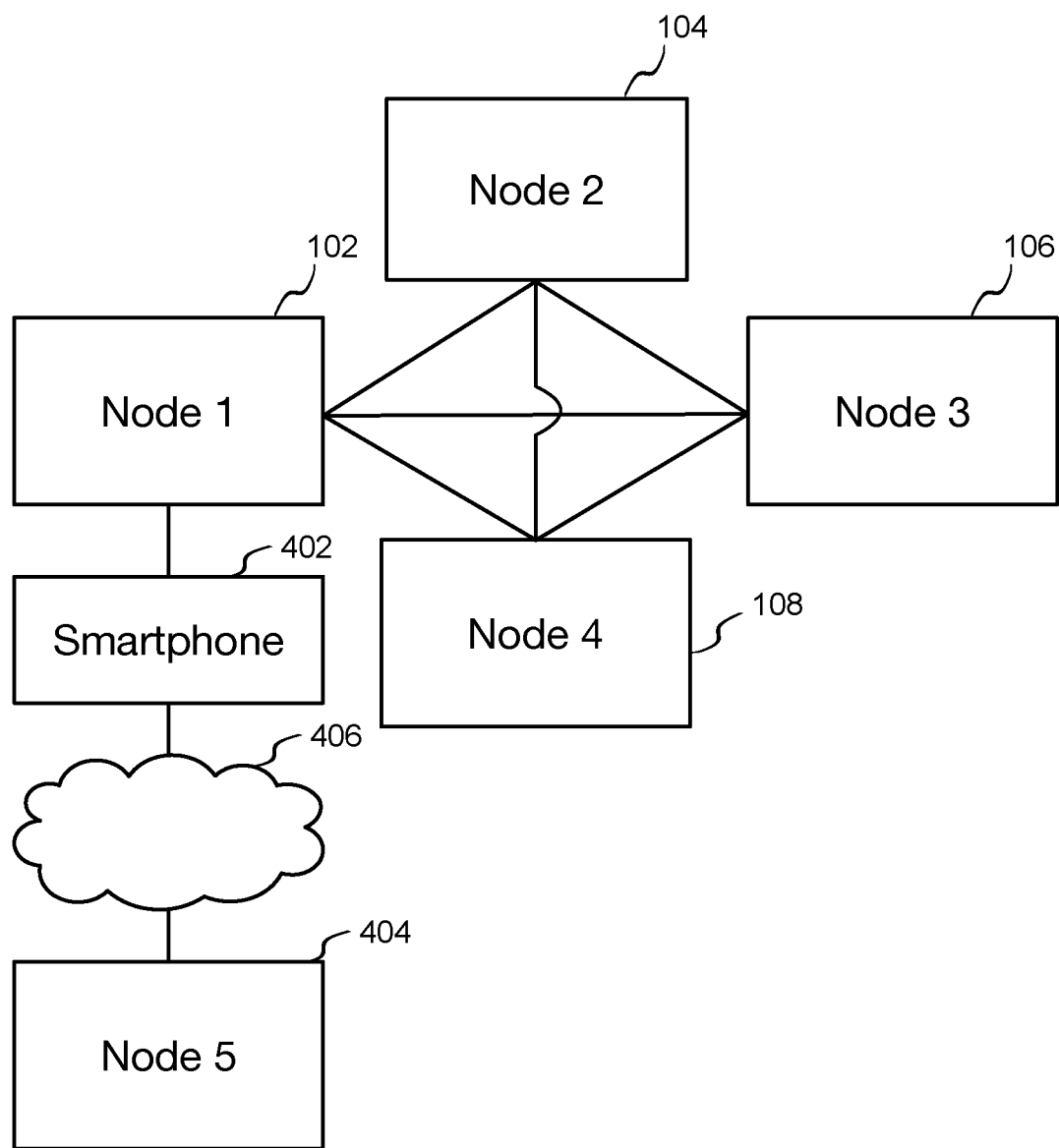
FIG. 4 is an example diagram of a network, according to some implementations.

FIG. 4 is an example diagram of a network 400, according to some implementations. Network 400 of FIG. 4 is similar to network 100 of FIG. 1, where nodes 102, 104, 106, and 108 are participating in a group voice chat. Also shown is a smartphone 402 to which node 404 is optionally connected.

In various implementations, the system enables one or more remote nodes such as node 404 (also labeled Node 5 in FIG. 4) to join the group of nodes in the group voice chat via an existing device in the group, such as node 404. For example, a remote user may join the group via a network 406 via smartphone 402 connected to existing node 102. Similar to the other nodes, remote node 404 may be a wearable device (e.g., earbud, smartphone, etc.). Network 406 may be any suitable network such as a cell phone network, the Internet, other type of network, or combination thereof. In various implementations, remote node 404 may share the subinterval allocated to the host node (e.g., node 102). In some implementations, the system may allocate and assign an available subinterval to remote node 404.

As indicated herein, in various implementations, each of nodes 102, 104, 106, and 108 may include a left ear device and a right ear device. The following describes example implementations involving nodes having a left ear device and a right ear device.

Figure 5:
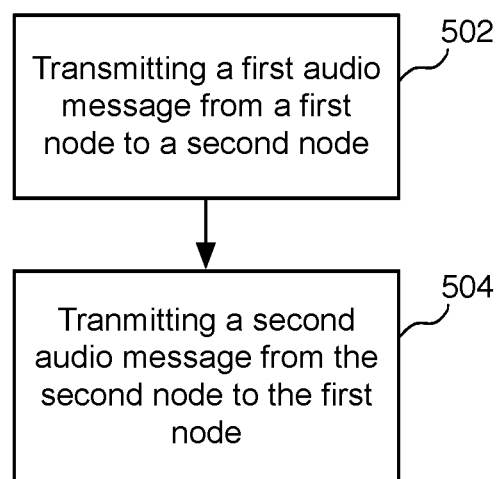
FIG. 5 is an example flow diagram for enabling a group voice chat, according to some implementations.

FIG. 5 is an example flow diagram for enabling a group voice chat, according to some implementations. Referring to both FIGS. 1 and 5, a method is initiated at block 502, where a system such as node 102 transmits an initial audio message to another node such as node 104.

In various implementations, the nodes 102, 104, 106, and 108 are wearable devices. As such, these nodes may be referred to as terminal nodes. The system enables the nodes to communicate directly with each other without the need for call terminals such as smartphones, or other central devices or systems. As indicated herein, nodes 102-104 may be referred to as terminal nodes. In these example implementations, node 102 includes a left ear device and right ear device. Similarly, node 104 includes second left ear device and second right ear device.

At block 504, a system such as node 104 transmits a subsequent audio message to node 102, where audio transmissions of the voice chat are transmitted directly between nodes 102 and 104. In various implementations, the system negotiates between a node having multiple associated devices such as a left ear device and a right ear device. For example, in various implementations, the system pairs the left ear device and the right ear device of each node having such devices. As such, the left ear device and the right ear device receive audio transmissions substantially simultaneously. This enables the user to receive audio messages from at both ears without comprehension problems.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
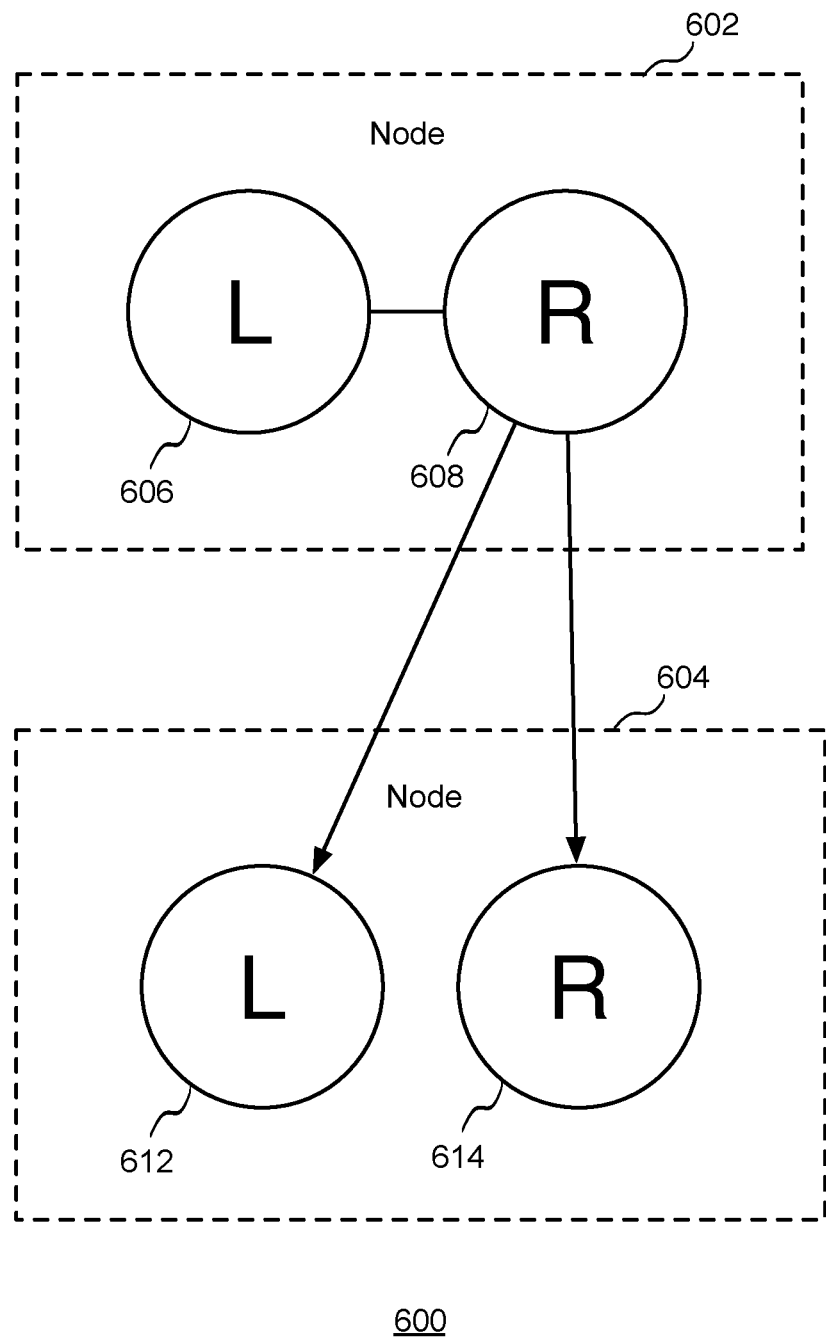
FIG. 6 is an example diagram of a network, according to some implementations.

FIG. 6 is an example diagram of a network 600, according to some implementations. Shown are nodes 602 and 604, where node 602 is associated with a left ear device 606 and a right ear device 608. Also, node 604 is associated with a left ear device 612 and a right ear device 614. In this example, implementation, presume that node 602 is broadcasting an audio message, and node 604 is a recipient of the audio message.

In various implementations, the system pairs the left ear device and the right ear device of each node. For node 602, the system selects either left ear device 606 or right ear device 608 to function as the primary transmitter of node 602. In this example implementation, the system of node 602 makes this determination. In some implementations, right ear device 608 may be the default primary transmitter. In some implementations, left ear device 606 may be the default primary transmitter. The system or node 602 then transmits one or more audio messages to other nodes from the designated primary transmitter. This avoids conflicts between two transmitting devices of the same node. In some implementations, if a problem arises with the primary transmitter (e.g., that of the right ear device), the other transmitter may take over the function of primary transmitter (e.g., that of left ear device). This may occur if, for example, the battery of the primary transmitter runs out of power, or if the right ear device is dropped and goes out of range.

In this scenario, right ear device 608 broadcasts audio messages to all node devices (e.g., to both left ear device 612 and right ear device 614, etc.). These recipient ear devices are being paired. As such, they output audio messages to their user substantially simultaneously.

Figure 7:
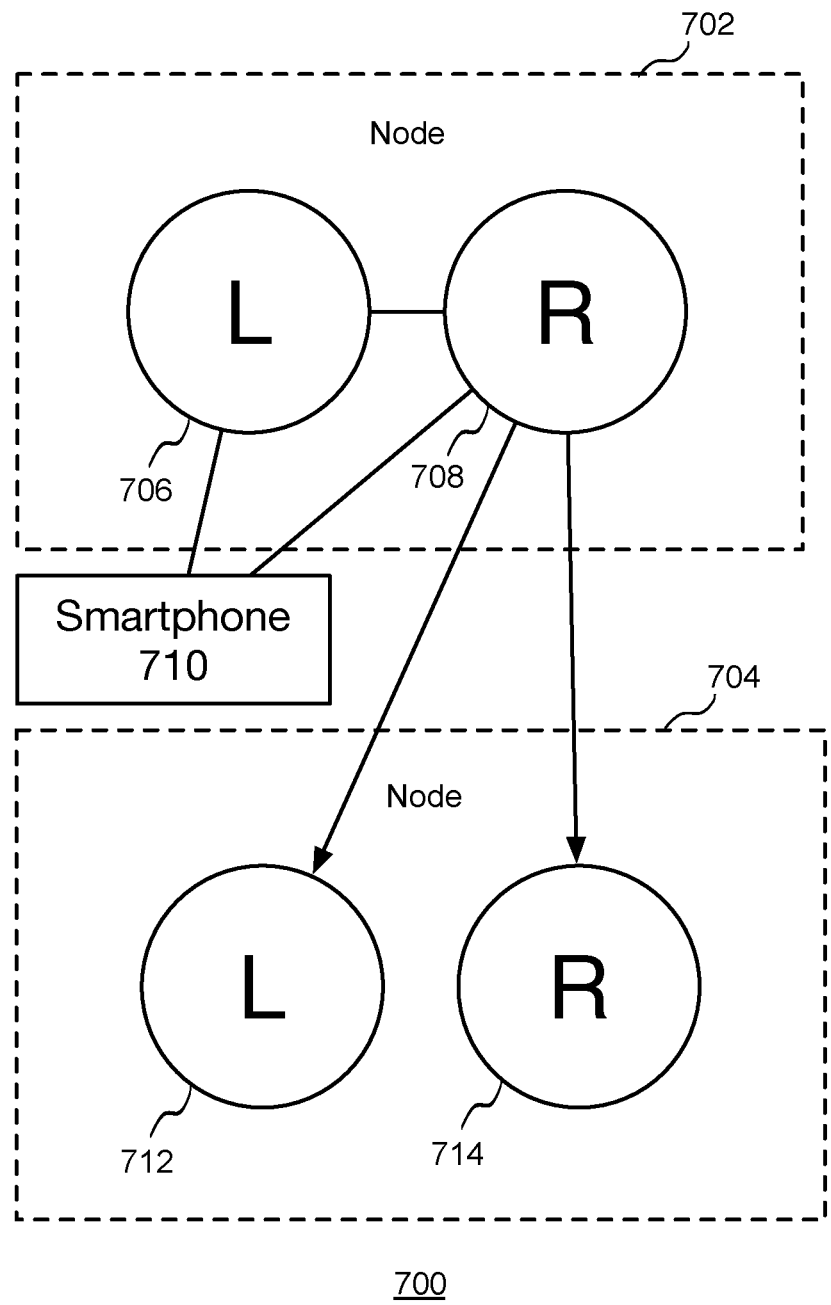
FIG. 7 is an example diagram of a network, according to some implementations.

FIG. 7 is an example diagram of a network 700, according to some implementations. Shown are nodes 702 and 704, where node 702 is associated with a left ear device 706 and a right ear device 708. Also, node 704 is associated with a left ear device 712 and a right ear device 714. In this example implementation, presume that node 702 is broadcasting an audio message, and node 704 is a recipient of the audio message.

In various implementations, the system or node 702 establishes communication between a smartphone 710 and left ear device 706 and right ear device 708 of node 702. The system then selects, at the smartphone, either left ear device 706 or right ear device 708 to function as a primary transmitter. As such, the system transmits one or more audio messages from the primary transmitter of right ear device 708 to other nodes such as to node 704.

FIG. 8 is an example diagram of a transmission schedule 800, according to some implementations. Shown is a time interval 802, within which audio messages are broadcast. In various implementations, audio transmissions of a voice chat are transmitted in a sequence of time intervals, as described above. As shown, time intervals include subintervals. For example, interval 802 includes subintervals 810, 820, 830, 840, 850, 860, 870, and 880 (also labeled SI-1, SI-2, SI-3, SI-4, SI-5, SI-6, SI-7, and SI-8). In various implementations, a time interval is a time slot that is dedicated to a given node for transmitting audio messages and associated control data, as described herein.

As indicated herein, in various implementations, the transmitting of the audio message between nodes of the group voice chat is in a Bluetooth broadcast. Also, in the Bluetooth broadcast, audio transmissions are transmitted in a sequence of time intervals, where the time intervals include subintervals, as described herein.

In various implementations, the system allocates subintervals to left ear devices and right ear devices of nodes participating in the voice chat. The system then causes transmitters of the left ear devices and the right ear devices to transmit audio messages during their respective subintervals. In various implementations, a given transmission schedule may include additional subintervals (not shown) that may be for duplicates of audio messages for redundancy, in case any messages get dropped. Also, the system may dynamically adjust transmission schedule 802 to change the number and size of subintervals. The system broadcasts updated transmission schedules to the other nodes in the chat.

In various implementations, the system allocates a first subinterval to the node that initiates a chat such as node 102 of FIG. 1. As shown in FIG. 8, subintervals 810 and 820 may be allocated or assigned to node 102 (also labeled N-1 in FIG. 8). In various implementations, as indicated above, the node transmits an initial audio message during its designated subintervals, where one or more audio messages are broadcast to other nodes in the chat.

Similarly, the system allocates subintervals to the other nodes in the chat, such as nodes 104, 106, and 108 of FIG. 1. As shown in FIG. 8, subintervals 830, 840, 850, 860, 870, and 880 may be allocated or assigned to respective nodes 104, 106, and 108 (also labeled N-2, N-3, and N-4, respectively). In various implementations, usage of transmission schedule 800 may be based on implementations described herein, such as those described in connection with FIGS. 5, 6, and 7, for example.

Implementations described herein provide various benefits. For example, the system enables a group voice chat directly between devices of a group without the need for a remote centralized system. Implementations described herein also accommodate changes in the number of devices in the group participating in the group voice chat.

Because each node or transmitter is assigned a dedicated time slot or set of time slots in a transmission schedule, there is no need for a push-to-talk, list-before-talk, random back-off, or other techniques that may impede the natural flow of conversation. To the users in a group voice chat experience, normal conversation takes place as if around a kitchen table.

Figure 9:
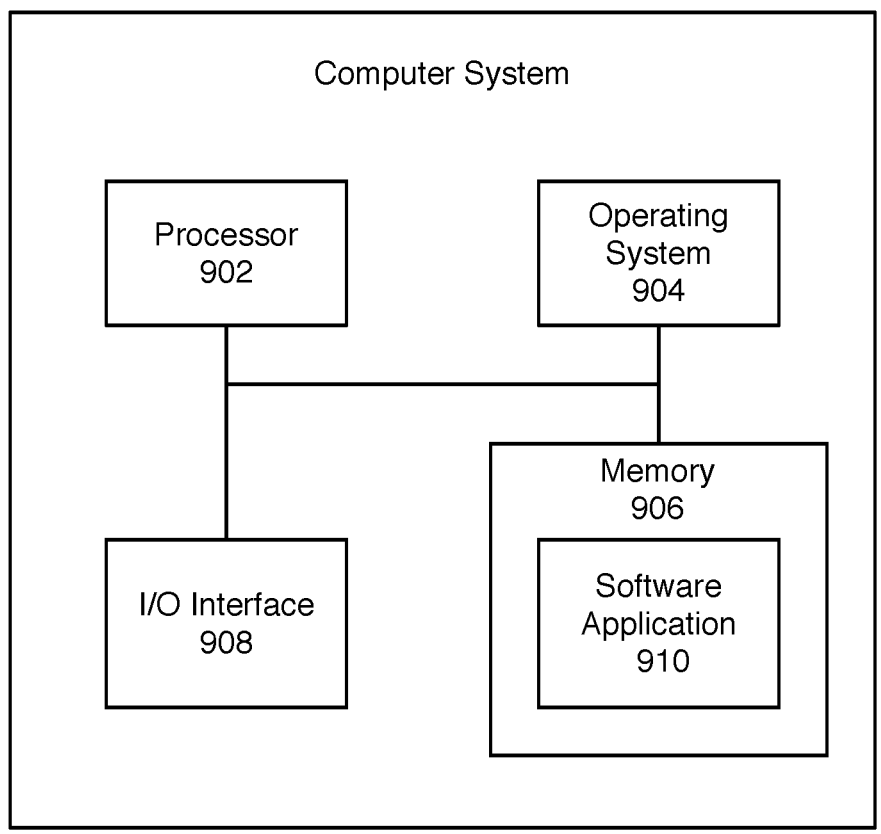
FIG. 9 is a block diagram of an example computer system, which may be used for some implementations described herein.

FIG. 9 is a block diagram of an example computer system 900, which may be used for some implementations described herein. For example, computer system 900 may be used to implement any one or more devices of FIG. 1 participating in the group voice chat, as well as to perform implementations described herein. In some implementations, computer system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of computer system 900 or any suitable processor or processors associated with computer system 900 or any suitable system may perform the steps described. Implementations described herein may be carried out on a user device, on a server, or a combination of both.

Computer system 900 also includes a software application 910, which may be stored on memory 906 or on any other suitable storage location or computer-readable medium. Software application 910 provides instructions that enable processor 902 to perform the implementations described herein and other functions. Software application may also include an engine such as a network engine for performing various functions associated with one or more networks and network communications. The components of computer system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computer system 900 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
establishing communication between devices in a group of devices;
initiating, at a first device of the group of devices, a group voice chat between the first device and one or more other devices of the group of devices in a Bluetooth broadcast, wherein audio transmissions of the group voice chat are transmitted in a sequence of time intervals, and wherein the time intervals include subintervals;
allocating a first subinterval of the subintervals to the first device, wherein the first device transmits a first audio message during the first subinterval, and wherein the first audio message is broadcast to the group of devices; and
allocating a second subinterval of the subintervals to a second device of the group of devices, wherein the second device transmits a second audio message during the second subinterval, and wherein the second audio message is broadcast to the group of devices.

2. The system of claim 1, wherein one or more devices of the group of devices are wearable devices.

3. The system of claim 1, wherein a transmission schedule indicates an allocation of subintervals to devices of the group of devices.

4. The system of claim 1, wherein a transmission schedule indicates subintervals for transmission of audio messages and subintervals for transmission of control data.

5. The system of claim 1, wherein the first device manages a transmission schedule, and wherein the first device broadcasts the transmission schedule to the group of devices.

6. The system of claim 1, wherein the logic when executed is further operable to cause the one or more processors to perform operations comprising maintaining a predetermined number of available subintervals based on a number of devices in the group of devices.

7. The system of claim 1, wherein the logic when executed is further operable to cause the one or more processors to perform operations comprising enabling at least one remote device to join the group of devices via at least one existing device of the group of devices.

8. A non-transitory computer-readable storage medium with program instructions stored thereon, the program instructions when executed by one or more processors are operable to cause the one or more processors to perform operations comprising:
establishing communication between devices in a group of devices;
initiating, at a first device of the group of devices, a group voice chat between the first device and one or more other devices of the group of devices in a Bluetooth broadcast, wherein audio transmissions of the group voice chat are transmitted in a sequence of time intervals, and wherein the time intervals include subintervals;
allocating a first subinterval of the subintervals to the first device, wherein the first device transmits a first audio message during the first subinterval, and wherein the first audio message is broadcast to the group of devices; and
allocating a second subinterval of the subintervals to a second device of the group of devices, wherein the second device transmits a second audio message during the second subinterval, and wherein the second audio message is broadcast to the group of devices.

9. The computer-readable storage medium of claim 8, wherein one or more devices of the group of devices are wearable devices.

10. The computer-readable storage medium of claim 8, wherein a transmission schedule indicates an allocation of subintervals to devices of the group of devices.

11. The computer-readable storage medium of claim 8, wherein a transmission schedule indicates subintervals for transmission of audio messages and subintervals for transmission of control data.

12. The computer-readable storage medium of claim 8, wherein the first device manages a transmission schedule, and wherein the first device broadcasts the transmission schedule to the group of devices.

13. The computer-readable storage medium of claim 8, wherein the instructions when executed are further operable to cause the one or more processors to perform operations comprising maintaining a predetermined number of available subintervals based on a number of devices in the group of devices.

14. The computer-readable storage medium of claim 8, wherein the instructions when executed are further operable to cause the one or more processors to perform operations comprising enabling at least one remote device to join the group of devices via at least one existing device of the group of devices.

15. A computer-implemented method comprising:
establishing communication between devices in a group of devices;
initiating, at a first device of the group of devices, a group voice chat between the first device and one or more other devices of the group of devices in a Bluetooth broadcast, wherein audio transmissions of the group voice chat are transmitted in a sequence of time intervals, and wherein the time intervals include subintervals;
allocating a first subinterval of the subintervals to the first device, wherein the first device transmits a first audio message during the first subinterval, and wherein the first audio message is broadcast to the group of devices; and
allocating a second subinterval of the subintervals to a second device of the group of devices, wherein the second device transmits a second audio message during the second subinterval, and wherein the second audio message is broadcast to the group of devices.

16. The method of claim 15, wherein one or more devices of the group of devices are wearable devices.

17. The method of claim 15, wherein a transmission schedule indicates an allocation of subintervals to devices of the group of devices.

18. The method of claim 15, wherein a transmission schedule indicates subintervals for transmission of audio messages and subintervals for transmission of control data.

19. The method of claim 15, wherein the first device manages a transmission schedule, and wherein the first device broadcasts the transmission schedule to the group of devices.

20. The method of claim 15, wherein the instructions when executed are further operable to cause the one or more processors to perform operations comprising maintaining a predetermined number of available subintervals based on a number of devices in the group of devices.

\* \* \* \* \*